United States Patent Office 2,931,830
Patented Apr. 5, 1960

2,931,830
BETA - (2,4,6 - TRIIODO - 3 - HYDROXYPHENYL)- PROPIONIC ACIDS AND PREPARATION THEREOF

Sydney Archer, Albany, N.Y., assignor to Sterling Drug Inc., New York, N.Y., a corporation of Delaware No Drawing. Application March 20, 1952
Serial No. 277,722

9 Claims. (Cl. 260—521)

This invention relates to a new series of 2,4,6-triiodo-3-hydroxyphenylalkanoic acids and to the prepartion thereof. These new compounds are useful as X-ray contrast media, and are particularly valuable as cholecystographic agents.

My new compounds have the following structural formula:

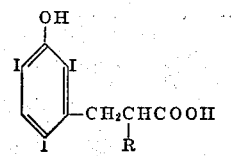

wherein R represents a member of the group consisting of hydrogen and lower-alkyl groups having from 1 to 3 carbon atoms. Species included within the scope of the invention are beta-(2,4,6-triiodo-3-hydroxyphenyl) propionic acid, alpha-methyl-beta-(2,4,6-triiodo-3-hydroxyphenyl)propionic acid, alpha-ethyl-beta-(2,4,6-triiodo-3-hydroxyphenyl)propionic acid, alpha-n-propyl-beta-(2,4,6-triiodo-3-hydroxyphenyl)propionic acid, and alpha - isopropyl - beta - (2,4,6-triiodo-3-hydroxyphenyl) propionic acid. Also within the purview of the invention are the above compounds in the form of their non-toxic salts. Acceptable non-toxic salts are those in which the cations are relatively innocuous to the animal organism in the doses administered. The salts are prepared by the neutralization of the triiodohydroxyphenylalkanoic acids with inorganic bases such as sodium hydroxide, potassium hydroxide and ammonium hydroxide, or with organic bases such as methylamine, ethylamine, ethanolamine, diethanolamine, triethanolamine and the like. Any of the above named bases neutralize the carboxyl group of the 2,4,6-triiodo-3-hydroxyphenylalkanoic acids, and the strong inorganic bases in sufficient quantity also neutralize the phenolic hydroxy group, giving a di-salt, such as a di-sodium salt or a dipotassium salt.

The 2,4,6-triiodo-3-hydroxyphenylalkanoic acids can be prepared by exhaustive iodination of the corresponding m-hydroxyphenylalkanoic acids using an excess of iodine monochloride in acid solution. The reaction is conveniently carried out by dissolving the m-hydroxyphenylalkanoic acid in dilute acid, for example hydrochloric acid or acetic acid, adding the iodine monochloride gradually, and heating the mixture between about 50° C. and 150° C. The intermediate m-hydroxyphenylalkanoic acid is conveniently prepared by a Perkin condensation using m-hydroxybenzaldehyde, an acid anhydride, $(RCH_2CO)_2O$, and a salt of the acid, $RCH_2COOH$, to produce a substituted cinnamic acid, $m-HOC_6H_4CH=C(R)COOH$, followed by reduction of the double bond, either catalytically or with sodium amalgam.

Alternatively the compounds of the invention can be prepared by hydrolysis with strong acid of the diazonium salt of the corresponding 2,4,6-triiodo-3-aminophenylalkanoic acid. The intermediate 2,4,6-triiodo-3-aminophenylalkanoic acid can be prepared by a Perkin condensation using m-nitrobenzaldehyde, simultaneous reduction of the nitro group and the double bond of the substituted cinnamic acid, followed by exhaustive iodination of the resulting 3-aminophenylalkanoic acid.

The compounds of my invention have been found to be more effective in producing shadows of the gall-bladder than alpha - phenyl - beta-(4-hydroxy-3,5-diiodophenyl) propionic acid which is currently the cholecystographic agent of choice.

The following examples will further illustrate the invention.

Example 1

(a) *m-Hydroxycinnamic acid.*—A mixture of 18.3 g. of m-hydroxybenzaldehyde, 12.3 g. of fused sodium acetate and 29.7 g. of acetic anhydride was stirred and refluxed at 125° C. for about fifteen hours. The mixture was then poured into water, heated to decompose excess acetic anhydride, and enough sodium hydroxide solution was added to make the mixture basic. The alkaline solution was boiled for fifteen minutes, treated with activated charcoal, filtered, cooled and acidified to Congo red with concentrated hydrochloric acid. A crystalline product was obtained upon cooling, and this was collected by filtration, giving 15.2 g. of m-hydroxycinnamic acid, M.P. 187–192° C. Further recrystallization from water gave a sample melting at 190–192° C.

(b) *Beta-(m-hydroxyphenyl)propionic acid.*—Sodium amalgam (283 g. containing 3% of sodium) was added to a solution of 20.2 g. of m-hydroxycinnamic acid, prepared as described in part (a) above, and 16.8 g. of potassium hydroxide in 250 ml. of water, and the mixture was stirred at room temperature for about one-half hour and then heated on a steam bath for one and one-half hours. The mixture was then cooled, the mercury separated, and the solution concentrated to dryness. The residue was dissolved in a hot mixture of ethyl acetate and petroleum ether (Skellysolve C), and the solution was treated with activated charcoal and filtered. The filtrate was concentrated somewhat, and then cooled giving 15.4 g. of beta-(m-hydroxyphenyl)propionic acid, M.P. 104–107° C.

(c) *Beta - (2,4,6-triiodo - 3 - hydroxyphenyl)propionic acid.*—Beta-(m-hydroxyphenyl)propionic acid (15.4 g.), prepared as described in part (b) above, was dissolved in 150 ml. of acetic acid, and water (150 ml.) was added until incipient crystallization began. Iodine monochloride (48.5 g., 15.2 ml.) was added dropwise, allowing the temperature to rise to 50° C. After all of the iodine monochloride had been added the reaction mixture was stirred for one hour, heated to 80° C. and then allowed to cool while the mixture was stirred for several hours longer. The resulting precipitate was filtered and washed with dilute acetic acid. Recrystallization from 95% alcohol, using charcoal and sulfur dioxide for decolorizing purposes, gave a first crop of 15 g. of beta-(2,4,6-triiodo-3-hydroxyphenyl)propionic acid, M.P. 208–210° C. (uncorr.). When recrystallized from 95% alcohol a pure sample having the M.P. 219.8–222° C. (corr.) was obtained.

*Analysis.*—Calcd. for $C_9H_7O_3I_3$: C, 19.87; H, 1.30; I, 70.00. Found: C, 19.68; H, 1.49; I, 70.20.

Example 2

(a) *Alpha-methyl-m-hydroxycinnamic acid.*—A mixture of 100 g. of m-hydroxy-benzaldehyde, 76.8 g. of fused sodium propionate and 200 g. of propionic anhydride was stirred and refluxed at 140° C. for twenty hours. The mixture was then poured into water and acidified with hydrochloric acid. The organic material was extracted with chloroform, the chloroform was exaporated, and the residue stirred for one and one-half hours with dilute potassium hydroxide solution. Acetic acid was added to make the solution almost neutral, but still slightly basic, the mixture was stirred with activated charcoal for about fifteen minutes, filtered, and the filtrate acidified to Congo red with hydrochloric acid. A crystalline product was obtained upon cooling for several hours, and this was collected by filtration and recrystallized from water giving 71 g. of alpha-methyl-m-hydroxycinnamic acid. Another recrystallization gave material melting at 136–138° C.

*Analysis.*—Calcd. for $C_{10}H_{10}O_3$: C, 67.40; H, 5.66. Found: C, 68.20; H, 6.33.

(*b*) *Alpha - methyl - beta-(m-hydroxyphenyl)propionic acid.*—A solution of 65 g. of alpha-methyl-m-hydroxycinnamic acid, prepared as described in part (*a*) above, and 20.5 g. of potassium hydroxide in 600 ml. of water was added to 840 g. of 3% sodium amalgam, and the mixture was stirred while heating on a steam bath for several hours. The mixture was then cooled, the mercury separated, and the reaction mixture was acidified and extracted with ether. The ether extracts were concentrated giving a residue containing alpha-methyl-beta-(m-hydroxyphenyl)propionic acid.

(*c*) *Alpha-methyl-beta-(2,4,6-triiodo-3-hydroxyphenyl) propionic acid.*—Alpha-methyl-beta-(m-hydroxyphenyl) propionic acid (18.5 g.), prepared as described in part (*b*) above, was dissolved in 120 ml. of acetic acid. The solution was warmed on a steam bath, and 65 ml. of water was added followed by 48.5 g. (15.2 ml.) of iodine monochloride. The mixture was stirred and heated for several hours, and water was then added to cause precipitation of the product. The semi-solid precipitate was triturated with a small amount of 95% alcohol, collected by filtration and washed with low boiling petroleum ether. Recrystallization from dilute alcohol, using charcoal for decolorization, gave 14 g. of alpha-methyl-beta-(2,4,6-triiodo-3-hydroxyphenyl)propionic acid, M.P. 167–171° C. (uncorr.). When recrystallized from dilute alcohol a pure sample having the M.P. 175.0–176.8° C. (corr.) was obtained.

*Analysis.*—Calcd. for $C_{10}H_9O_3I_3$: C, 21.53; H, 1.63; I, 68.25. Found: C, 21.76; H, 1.89; I, 68.60.

The compounds of Examples 1 and 2, beta-(2,4,6-triiodo-3-hydroxyphenyl)propionic acid and alpha-methyl-beta-(2,4,6-triiodo-3-hydroxyphenyl)propionic acid, when administered orally to cats in a dose of 100 mg. per kg. of body weight, gave excellent shadows of the gall-bladder in X-ray pictures. These compounds were about 120–140% as effective as iodoalphionic acid [alpha-phenyl-beta-(4-hydroxy-3,5-diiodophenyl)propionic acid] at the same dose level. No toxic manifestations in the cats were observed.

I claim:
1. A compound of the group consisting of the acid having the formula

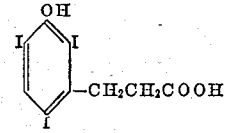

and its non-toxic alkali metal and amine salts.

2. Beta-(2,4,6-triiodo-3-hydroxyphenyl)propionic acid.

3. A compound of the group consisting of acids of the formula

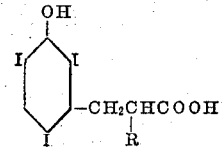

wherein R is an alkyl radical of 1 to 3 carbon atoms and their non-toxic alkali metal and amine salts.

4. Alpha-methyl-beta-(2,4,6-triiodo-3-hydroxyphenyl) propionic acid.

5. Alpha-ethyl-beta-(2,4,6-triiodo-3-hydroxyphenyl)propionic acid.

6. Alpha-n-propyl-beta-(2,4,6-triiodo-3-hydroxyphenyl) propionic acid.

7. Alpha-isopropyl-beta-(2,4,6-triiodo-3-hydroxyphenyl) propionic acid.

8. The process for preparing beta-(2,4,6-triiodo-3-hydroxyphenyl)propionic acid which comprises heating beta-(m-hydroxyphenyl)propionic acid in acid solution with an excess of iodine monochloride.

9. The process for preparing alpha-methyl-beta-(2,4,6-triiodo-3-hydroxyphenyl)propionic acid which comprises heating alpha-methyl-beta-(m-hydroxyphenyl)propionic acid in acid solution with an excess of iodine monochloride.

References Cited in the file of this patent

UNITED STATES PATENTS 2,400,433    Natelson et al. _____ May 14, 1946

FOREIGN PATENTS 517,382    Great Britain _____ Mar. 28, 1944

OTHER REFERENCES

V. Pechmann et al.: Beilstein (Handbuch, 4th ed.), vol. 10, page 189 (1927).

Lewis et al.: J. Am. Chem. Soc., vol. 71, pages 3749–52 (1949).